INVENTOR
ARLON D. KOMPELIEN
BY
Amund R Dahle
ATTORNEY

June 23, 1964 A. D. KOMPELIEN 3,138,755

TRANSCEIVER SELECTIVE CALL SYSTEM
UTILIZING TUNED REED FILTERS

Filed April 9, 1962 2 Sheets-Sheet 2

INVENTOR
ARLON D. KOMPELIEN
BY
Omund R. Dahl
ATTORNEY

United States Patent Office 3,138,755

Patented June 23, 1964

3,138,755

TRANSCEIVER SELECTIVE CALL SYSTEM UTILIZING TUNED REED FILTERS

Arlon D. Kompelien, Richfield, Minn., assignor to Minneapolis-Honeywell Regulator Company, Minneapolis, Minn., a corporation of Delaware Filed Apr. 9, 1962, Ser. No. 185,980
11 Claims. (Cl. 325—18)

This invention relates to a two-way selective call system for use on mobile radio and the like such as the Citizens' Band radio transceiver equipment. More specifically, this invention is related to equipment used in conjunction with a pair of Citizens' Band transceivers which will turn on the audio of either transceiver in response to a selective call transmitted remotely from the other transceiver.

In the present day use of Citizens' Band radio for short wave communication between automobile and home or between other remote locations, it has been found that with the home unit left on to receive calls from the remote location during the day, a considerable amount of inconvenience and distraction is caused with other stations using the same channels and the resultant attention required in determining who is calling becomes a nuisance. The present invention is capable of alleviating this nuisance, in that the device used in conjunction with each of a pair of transceivers which are left in the stand-by condition, that is, with the audio output disconnected, can send to each other a selective call to excite the other receiver to close the audio output loop or to activate an alarm.

In this invention an electrically excited resonant-reed tuning fork or tuned-reed narrow band pass filter is utilized for a dual purpose device and is operative both in receiving and in transmitting the selective signal. In receiving, the tuned reed operates as an extremely narrow band pass filter to discriminate and pass only the selected signal frequency and to reject all others. In transmitting, the tuned reed device is connected in an oscillating arrangement and utilized to modulate the transmitter at the resonant frequency of the tuned-reed. In this manner considerable simplification of design and reduction in the number and cost of components is achieved.

It is therefore an object of the invention to provide an improved selective call system for use on radio communication between two remote points.

It is another object of this invention to provide a two-way selective call system for use on Citizens' Band radio between a pair of transceivers operating remotely from each other.

It is a more specific object of this invention to provide apparatus in Citizens' Band transceivers which will be effective to actuate the transceiver output from a stand-by to an operative condition upon the receipt of a selective call.

Figure 1:
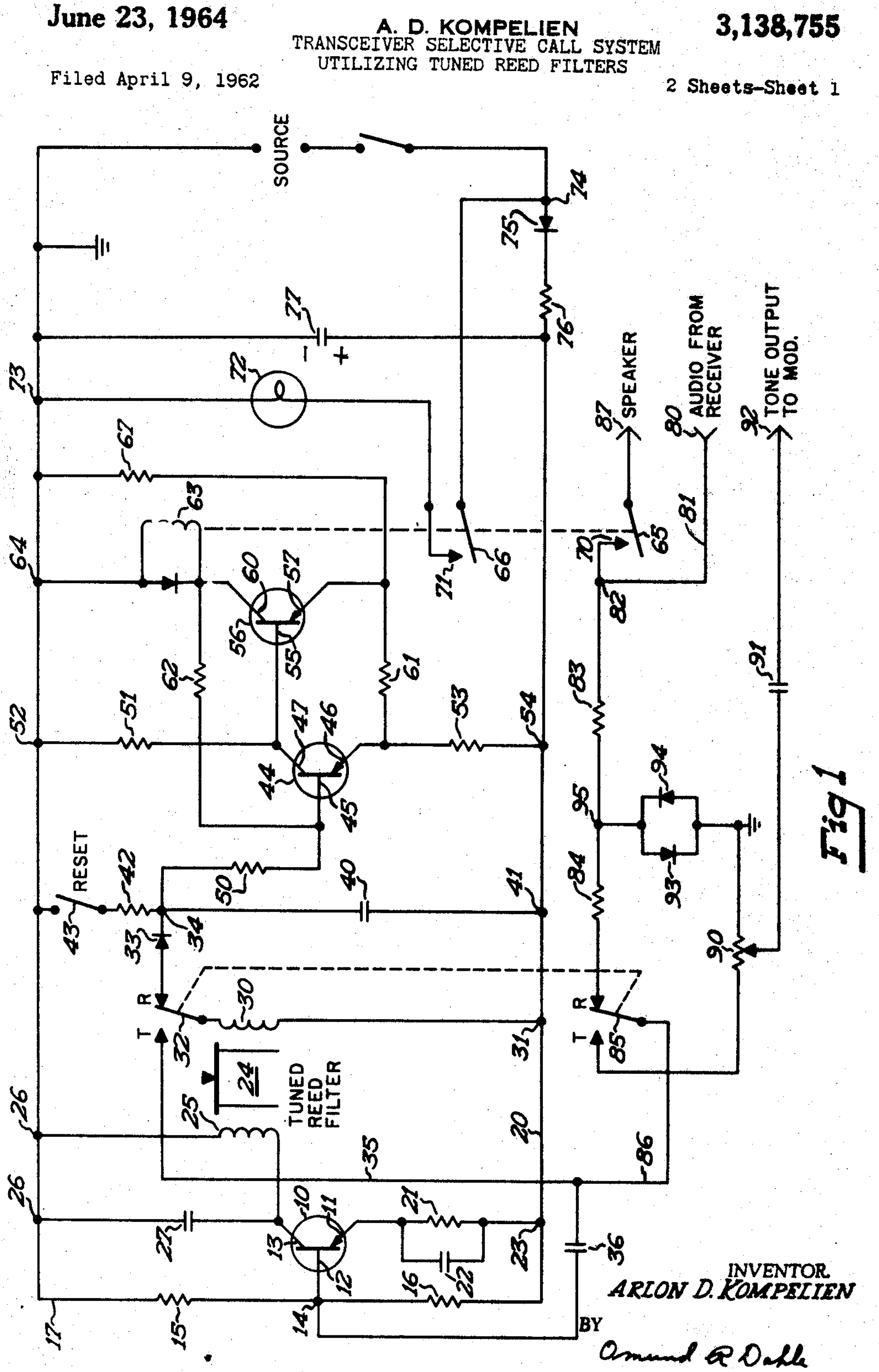
Figure 2:
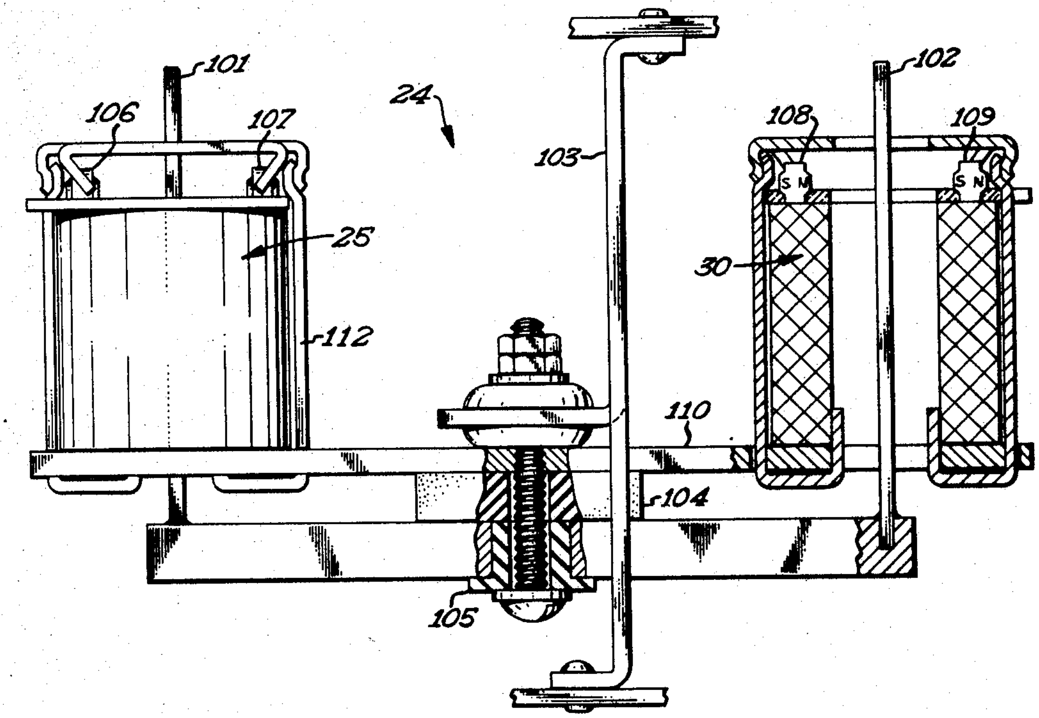

These and other objects of this invention will become more apparent upon a further consideration of the accompanying claims, specification and drawing of which:

FIGURE 1 of the drawing is a schematic representation of a preferred embodiment of the invention, and FIGURE 2 is a diagrammatic representation of the tuned reed filter.

Referring now to the drawing, there is disclosed an amplifying device 10, here shown as a p-n-p type transistor, which also has an emitter electrode 11, a base electrode 12 and a collector electrode 13. The base electrode 12 is connected to a junction 14 on a voltage divider which comprises a pair of resistors 15 and 16. The resistor 15 is connected to a ground conductor 17 and the opposite end of the voltage divider at resistor 16 is connected to a conductor 20 which supplies a positive voltage. The emitter 11 is connected by a resistor 21, which is paralleled by a bypass capacitor 22, to a junction 23 on the conductor 20. The resistors 15, 16 and 21 provide a desired bias for the transistor 10. The collector electrode 13 is connected to a narrow band-pass filter, and in the preferred embodiment disclosed the narrow band-pass filter is of the tuned reed variety. More specifically, the collector 13 is connected through a driving winding 25 of the device 24 to a junction 26 on the conductor 17. A capacitor 27 parallels the winding 25.

The tuned reed filter 24, as also shown in FIGURE 2, has one leg 101 of an electrical tuning fork arrangement in inductive relation with the driving coil winding 25 and the other leg 102 of the tuning fork in inductive relation with an output coil 30. The device operates as a band-pass filter by feeding a signal into the coil 25 associated with the first leg 101 of the tuning fork and sensing the output across the coil 30 associated with the other leg. The tuning fork assemblies have the coils 25 and 30 separated far enough so that the voltage induced in the output coil 30 is primarily due to mechanical action through the tuning fork and not by any mutual inductance between the coils 25 and 30. Magnetic shielding plate 103 is utilized between the coils and also serves as an assembly support. The tuning fork is preferably mounted on a resilient member such as rubber mounting spacers 104 and 105. The D.C. magnetic field for each coil is provided by magnets 106, 107, 108 and 109. The reeds may be made from a constant modulus material such as Ni-Span C, the reeds being soldered into a brass bar. The coil support member 110 has holes therein through which the vibrating reeds 101 and 102 freely extend.

Excitation of the reed 101 on the driving end of the assembly by an A.C. driving current in the driving coil or winding 25 occurs due to A.C. induced magnetic poles in the reed 101 reacting with the D.C. magnetic field. This operation may be explained by a consideration of FIGURE 2 which shows the assembly diagrammatically and partially in cross section. The construction of coil 25, reed 101, and magnets 106 and 107 is substantially the same as coil 30, reed 102 and magnets 108 and 109. With no current flowing in the coil 25, no force is exerted on the reed 101 since the D.C. magnetic fields from the two permanent magnets 106 and 107 on the top of the coil 25 cancel each other with respect to the reed (at least when the reed 101 is midway between the two magnets). If the reed is slightly off center with respect to the two magnets there will be a small steady force exerted on the reed but this force will not be fluctuating to cause vibration of the reed. Now let us assume a current flowing in the coil 25 in a direction to induce a north magnetic pole in the top end of reed 101 and a south magnetic pole in the bottom area of the reed. Now the reed has a component of force exerted on it to the right towards magnet 107 due to this current since unlike magnetic poles attract. In the same manner when the current in the coil is reversed, a force on the reed will be exerted towards the left. The forces are exerted on the reed near the top of the coil, as explained, and also near the bottom since the outside poles of permanent magnets 106 and 107 are effectively transferred down to the bottom of coil 25 by the low magnetic reluctance flow path members 112.

In normal operation, a D.C. component of current flows through the coil 25 because the transistor 10 is biased to conduction and its collector current flows through the coil. The A.C. component of driving current, described above, is superimposed on the D.C. component. The D.C. component is effective to cause a slight steady force on the reed 101 in one direction. This has a negligible effect and the A.C. component operates on the reed to cause it to vibrate when the A.C. frequency matches the natural mechanical resonance of the reed. Very little deflection of the reed is caused by any other frequencies since the energy of the reed for these frequencies cannot build up. At the resonant frequency, however, the energy of the reed builds up so that very little applied force at this frequency is needed to cause considerable deflection of the reed. Vibration of the reed then occurs due to the A.C. frequency component of current in the coil which matches the mechanical resonance.

Electrical excitation in the output coil 30 occurs due to motion of the reed 102 through this coil causing a fluctuation in the magnetic flux linking the turns of the coil. Coil 30 is similar in structure to coil 25 except that the number of turns on the coil may be different in order to be compatible in impedance with the attached circuit. Excitation of the reed 102 occurs due to mechanical coupling through the common bar which supports both reeds. Thus excitation of reed 102 occurs only when the reed 101 is vibrating, and it vibrates with substantially the same amplitude as reed 101. The two reeds and the common bar operate therefore in the manner of a tuning fork.

When reed 102 is midway between permanent magnets 108 and 109 no flux flows through the reed since the flux components from these magnets cancel in the reed. As the reed swings to the left towards magnet 108, the magnetic reluctance is lowered for the flux path from magnet 108 through the reed and a flux component flows through the reed in the downward direction. When the reed swings to the right, the opposite effect occurs resulting in an alternating flux linking the turns of output coil 30 whenever the reeds go into vibration and a corresponding A.C. voltage is induced in the coil 30.

The winding 30 has the lower end thereof connected to a junction 31 on the conductor 20 and the upper terminal of the winding 30 is connected to a movable switch contact 32 of a transmit-receive (T-R) switch 32. The switch 32 is shown in the receive position. The stationary contact 32R is connected through a rectifying diode 33 to a junction 34. The stationary contact 32T is connected through a conductor 35 and a capacitor 36 to the junction 14 and base electrode 12.

The junction 34 is connected through a capacitor 40 to a junction 41 on the conductor 20. Junction 34 is also connected through a resistor 42 and a reset switch 43 to the conductor 17.

Another amplifying valve, here shown as a pnp type transistor 44, has a base electrode 45, an emitter electrode 46 and a collector electrode 47. The base electrode is connected by means of a resistor 50 to the junction 34. The collector 47 is connected by means of a collector load resistor 51 to the conductor 17 at a junction 52 and the emitter 46 is connected by a means of resistor 53 to a junction 54 on the conductor 20. The collector electrode 47 is also directly connected to the base electrode 55 of a further transistor 56, which transistor also includes an emitter electrode 57 and a collector electrode 60. The emitter electrode 57 is connected through a resistor 61 to the emitter electrode 46, thus both transistors have a common emitter resistor 53. A bias resistor 67 connects the emitter electrode 57 to the conductor 17. A feedback resistor 62 is connected between collector 60 of transistor 56 and base electrode 45 of transistor 44 to provide regenerative feedback. The collector electrode 60 is also connected through load relay winding 63 to the conductor 17 at a junction 64. The relay 63 is shown as a DPST switch having movable contacts 65 and 66 making contact, respectively, with stationary contacts 70 and 71. The contacts 66 and 71 of relay 63 complete a circuit through an indicator lamp 72 from a junction 73 on the ground conductor 17 to a junction 74 on the positive source conductor 20. A rectifier 75, filter resistor 76 and filter capacitor 77 provide a positive filtered D.C. supply on the conductor 20 for the operating circuit.

Audio energy from the receiver is coupled through a terminal 80, a conductor 81, a junction 82, resistors 83 and 84, through another pair of contacts 85 of the T-R switch, and through conductor 86, capacitor 36 and junction 14 to the base electrode 12 of amplifying transistor 10. The normally open contacts 65 and 70 of relay 63 also complete a circuit from the terminal 80 through conductor 81, junction 82, switch terminals 70 and 65 to an output terminal 87 which is connected to a loudspeaker. A potentiometer 90 is connected between the contact 85T on the T-R switch and ground. A volume control wiper on the potentiometer 90 is connected through a capacitor 91 to an output terminal 92 which is apt to be connected to a tone output to the modulator of the transmitter. A pair of silicon diodes 93 and 94 are conneced in parallel and in polarity opposition one to the other to provide a signal level clipper at junction 95 between resistors 84 and 83, the clipping diodes connecting junction 95 to ground.

In connection with the use of the Citizens' Band radio for shortwave communication between a base unit and a remote unit, wherein the base unit is left on to receive calls from the remote unit, a considerable amount of inconvenience and distraction is caused with other stations using the same frequency channels and the resultant attention required in determining who is calling. This invention, therefore, is related to a device which is utilized in conjunction with a Citizens' Band transceiver so that the audio output of one transceiver may be turned on by a selective signal from the other transceiver. It is further recognized that it is desirable to be able to selectively call in both directions and it has been found desirable to transmit and also to sense the same frequency with one unit, so that separate units would not be required. In this invention, a single tuning fork apparatus performs both the transmitting and the receiving selectivity function. The units should be selective in call characteristics so that several groups may operate on each channel without the selective call from one group exciting the receivers of another.

Turning now to the operation in more detail, consideration will first be directed to the operation of the apparatus when the T-R switch is in the transmit position. Under these conditions, the amplifying transistor 10 and the tuned reed assembly 24 operate as an oscillator to provide an output tone at terminal 92. In other words, with the tuning fork assembly connected in its transmitting mode, the reed coil 30 which is normally connected to the detector circuit is transferred over to the input of the transistor 10 which drives the input coil 25 of the reed assembly 25. This makes a closed loop circuit and with proper phasing of the tuning fork reed coils, oscillation will take place at the mechanical resonant frequency of the tuning fork assembly. In more detail, with the contact 32 in the transmit position, the signal generated on winding 30 of the tuning fork assembly is regeneratively coupled back through the conductor 35 and capacitor 36 to base electrode 12 of the transistor 10. This signal is amplified in transistor 10 and is impressed on the driving winding 25 of the tuned reed filter. Let us assume that the two reeds of the tuning fork assembly are both tuned to vibrate at 500 cycles per second. An oscillation rapidly builds up in the tuned reed assembly and the transistor 10 at the 500 cycle frequency, the vibration of the reed inducing a 500 cycle signal in winding 30 which is connected through the conductors 35 and 86, contact 85T, to the voltage divider potentiometer 90 and through the coupling capacitor 91 to the output terminal 92. This tone then modulates the transmitter of the transceiver with a 500 cycle audio tone.

In this invention the tuned reed 24 operates in a dual capacity. As is discussed above, in the transmit position of the T-R switch, the tune reed 24 in cooperation with the transistor 10 operates as a 500 cycle per second oscillator. When the T-R switch is in the receive position, as shown in the drawing, the tuned reed is utilized as a very narrow band-pass filter. It operates as a band-pass filter by feeding a signal into driving winding 25 associated with the first leg of the tuning fork and sensing the output across the coil 30 on the other leg.

Considering now the operation of the circuit in the receive position of the T-R switch, it will be noted that all signals from the receiver audio section are coupled to terminal 80 and are fed through conductor 81 and resistor 83 to a junction 95. At this point, a pair of clipper diodes 93 and 94 attenuate the magnitude of the received signal when it exceeds the desired clipping voltage. The signal is then fed through resistor 84, contact 85R, conductor 86, capacitor 36, and junction 14 to the base electrode 12 of transistor 10. The signal at base 12 is amplified and appears on winding 25 of the tuned reed filter 24. At this point of the circuit, all signals except 500 cycles to which the reed is tuned are effectively eliminated. When a 500 cycle tone from the other transceiver is received, however, the 500 cycles fed into winding 25 vibrate reed member 101 at its resonant frequency causing the tuning fork to be actuated with the sympathetic oscillation or vibration of reed member 102 inducing a voltage on the winding 30. This induced voltage is rectified by a standard rectifier-condenser detector circuit comprising diode 33 and capacitor 40, and the energy stored on capacitor 40 is utilized to actuate the relay 63 through the bistable transistor circuit comprising transistors 44 and 56.

The bistable flip-flop circuit comprising transistors 44 and 56 is designed so that under normal conditions the transistor 44 is conductive, the transistor 56 is non-conductive and thus the relay 63 is de-energized, as shown in the drawing. A bias current path for the transistor 44 may be traced from the junction 54 through the emitter resistor 53, from emitter to base of transistor 44, through resistor 62 and the relay winding 63 to the junction 64 on the negative conductor 17. The resultant current flow through transistor 44 from emitter to collector is sufficient to develop a voltage drop across resistor 51 such transistor 56 is maintained cut-off. To aid in maintaining the transistor 56 non-conductive, the voltage divider comprising resistors 61 and 67 provides a voltage pedestal at emitter 57 with respect to emitter 46.

When the 500 cycle tone is transmitted from the remote unit, the capacitor 440 becomes charged with junction 34 being positive with respect to junction 41, this potential being in a direction to tend to reduce the conduction of transistor 44. As a result, the transistor 56 begins to conduct and the regenerative feedback through resistor 62 causes the circuit to flip to its second stable condition in which transistor 56 is conductive and transistor 44 is substantially cut off. The relay 63 is now energized by the current flowing through transistor 56 and the movable contacts 65 and 66 mate with their fixed contacts 70 and 71, respectively. This immediately closes the audio circuit from terminal 80 through the contacts 70 and 65 to terminal 87 which is connected to a loud speaker. Also, the contacts 66 and 71 close and energize the lamp 72 to give a visual indication that the remote station has called.

In the preferred embodiment, the flip-flop circuit is made bistable so that once the tuning fork unit operates, the relay has to be reset manually. For this purpose the reset switch 43 may be closed to provide a base bias circuit for the transistor 44 through the resistor 50 and 42 to the ground conductor 17. The flip-flop circuit may also be modified, if desired, such that it will revert to its preferred condition and de-energize relay 63 when the signal through the tuning fork stops.

The transmit-receive switch disclosed in the drawing preferably has an auxiliary contact which is connected in in parallel with the "push-to-talk" switch on the transceiver microphone. In this way when the T-R switch is activated to its transmit position to generate the 500 cycle tone, the transmitter is also put on the air for the duration of time with which the T-R switch is activated. Normally the selective tone is transmited only for the brief period required to operate the remote selective call unit. Once the selective call has been transmited, the T-R switch on the transceiver is utilized to actuate the transmitter and this has no effect on the T-R switch of the selective call system.

Many modifications of this invention will no doubt be apparent to those who are skilled in the art and I therefore wish it to be understood that I intend to be limited by the scope of the appended claims and not by the specific disclosure which is intended for illustrative purposes.

I claim:

1. In a two-way selective calling system for use between a pair of radio transceivers, the combination at each transceiver comprising: transmitter means; receiver means; first switch means operable in response to a suitable signal to connect said receiver means to loudspeaker output means; band pass frequency responsive means tuned to a selected call frequency and having an input winding and an output winding; means connecting said band pass frequency responsive means input winding to be energized by said radio receiver means; circuit means including further switch means connected between said output winding and said first switch means to operate said first switch means upon the occurrence of a signal on said output winding; and means including amplifier means and said further switch means for regeneratively connecting said output winding to said input winding so that said band pass frequency responsive means oscillates and provides an electrical output at said selected call frequency, said means further connecting said electrical output to modulate said transmitter means.

2. In a selecitve calling system for two-way use between a pair of radio transceivers, the combination at each transceiver comprising: transmitter means; receiver means; first switch means operable by a suitable signal to connect the output circuit of said receiver means to sound reproducing means; electrically driven resonant reed means tuned to a selected call frequency and having an input driving winding and an output winding; means connecting said resonant reed means input winding to be energized by said radio receiver means output circuit; circuit means connected between said output winding and said first switch means to energize said switch means upon the occurrence of a signal on said output winding; and means including amplifier means and further switch means operative to disconnect said output winding from said circuit means and to connect said output winding in a regenerative phase through said amplifier means to said input windings so that said resonant reed means oscillates and provides an electrical output at the resonant frequency of said reeds; and means connecting said electrical output to modulate said transmitter means.

3. In a selective calling system for two-way use between a pair of radio transceivers, the combination at each transceiver comprising: transmitter means; receiver means having an output circuit; normally de-energized first switch means energizable by a suitable signal to thereby connect said output circuit of said receiver means to sound reproducing means; electrically driven reed means resonant at a selected call frequency and having an input driving winding and an output winding, said input winding connected to be energized by said radio receiver means output circuit, said reed means being caused to oscillate only upon reception of said selected call frequency by said receiver means; circuit means connected between said output winding and said first switch means to energize said switch means upon the occurrence of a signal on said output winding; and means to be operated including amplifier means and further switch means for disconnecting said output winding from said circuit means and regeneratively connecting said output winding through said amplifier means to said input windings so that said resonant reed means oscillates and provides an electrical output at said selected frequency; and means connecting said electrical output to modulate said transmitter means.

4. In a selective calling system for two-way use between a pair of radio transceivers, the combination at each transceiver comprising: transmitter means; receiver means having an output circuit; sound reproducing means; normally de-energized first relay switch means having a control circuit adapted to be energized to thereby connect said output circuit to said sound reproducing means; electrically driven reed means resonant at a selected frequency and having an input driving winding and an output winding, said input winding connected to be energized by said radio receiver means output circuit, said reed means being caused to oscillate only upon reception of said selected frequency by said receiver means, the oscillation of said reed means inducing a signal on said output winding; circuit means connected between said output winding and said first switch means control circuit to energize said switch means upon the occurrence of said signal on said output winding; and means operable for connecting in a regenerative loop said output winding and said input winding so that said resonant reed means oscillates at said selected frequency and provides an electrical output signal; and means connecting said electrical output to modulate said transmitter means.

5. In a two-way selective calling system for use between a pair of radio transceivers, the combination at each transceiver comprising; transmitter means; receiver means; normally open first switch means adapted to be energized to connect said receiver means to output means; band pass freqency responsive means tuned to a selected call frequency and having a pair of frequency responsive members, one of said members being excited by an input winding in inductive relation therewith, and an output winding energized by the oscillation of the other of said frequency responsive members; means connecting said input winding to be energized by said radio receiver means; circuit means including further switch means connected between said output winding and said first switch means to energize said switch means upon the occurrence of a signal on said output winding; and means including amplifier means and said further switch means operable to regeneratively connect said output winding to said input winding so that said band pass frequency responsive means oscillates and provides an electrical output at said selected call frequency, said means further connecting said electrical output to modulate said transmitter means.

6. In a two-way selective calling system for use between a pair of radio transceivers, the combination at each transceiver comprising: transmitting means, receiver means; normally open first switch means adapted to be energized to connect said receiver means to loudspeaker output means; resonant reed means tuned to a selected call frequency and having a pair of reeds in tuning fork arrangement, one of said reeds being driven by a first input winding surrounding said one reed, and an output winding energized by the oscillation of the other of said reeds; means connecting said resonant reed means input winding to be energized by said radio receiver means; circuit means including further switch means connected between said output winding and said first switch means to energize said switch means upon the occurrence of a signal on said output winding; and means including amplifier means and said further switch means for regeneratively connecting said output winding to said input winding so that said resonant reed means oscillates and provides an electrical output at the resonant frequency of said reeds; and means connecting said electrical output to modulate said transmitter means.

7. In a two-way selective calling system for use between a pair of radio transceivers, the combination at each transceiver comprising: transmitter means; receiver means; first switch means having a control circuit adapted to be energized to connect said receiver means to loudspeaker output means; reed means resonant at a selected call frequency and having a pair of reed members in tuning fork arrangement, one of said reed members being driven by a first input winding whenever said selected frequency is applied to said winding, and an output winding energized by the sympathetic oscillation of the other of said reed members; means connecting said resonant reed means input winding to be energized by said radio receiver means; circuit means including further switch means connected between said output winding and said first switch means control circuit to energize said switch means upon the occurrence of a signal on said output winding; and means including amplifier means and said further switch means for regeneratively connecting said output winding to said input winding so that said resonant reed means oscillates and provides an electrical output at the resonant frequency of said reeds; and means connecting said electrical output to modulate said transmitter means.

8. In a two-way selective calling system for use between a pair of radio transceivers, the combination at each transceiver comprising: transmitter means; receiver means having an output circuit; first switch means adapted to be energized to connect said receiver means output circuit to sound reproducing means; electrically excited reed means resonant at a selected call frequency and having a pair of reed members in tuning fork arrangement, one of said reed members being excited by a first input winding whenever said selected frequency is applied to said winding, and an output winding having a signal induced thereon by the sympathetic oscillation of the other of said reed members; means connecting said resonant reed means input winding to be energized by said radio receiver means; circuit means including further switch means connected between said output winding and said first switch means to energize said first switch means upon the occurrence of a signal on said output winding; and means including amplifier means and said further switch means operable to regeneratively connect said output winding to said input winding so that said resonant reed means oscillates and provides an electrical output at the resonant frequency of said reeds; and means connecting said electrical output to modulate said transmitter means.

9. In selective calling system apparatus for use with radio transceiver equipment; transmitter means; receiver means; first switch means adapted to be energized to connect said receiver means to loudspeaker output means; electrically excited reed means resonant at a selected call frequency and having a pair of reed members in tuning fork type arrangement, one of said reed members being excited by a first input winding located in inductive relation therewith whenever said selected frequency is applied to said winding, and an output winding located in inductive relation to the other of said reed members and having a signal induced thereon by the sympathetic oscillation of said other reed member; means connecting said resonant reed means input winding to be energized by said radio receiver means; circuit means including further switch means connected between said output winding and said first switch means to energize said first switch means upon the occurrence of a signal on said output winding; and means including amplifier means and said further switch means operable to regeneratively connect said output winding to said input winding so that said resonant reed means oscillates and provides an electrical output at the resonant frequency of said reeds; and means connecting said electrical output to modulate said transmitter means.

10. In selective calling system apparatus for use with radio transceiver equipment; electrically excited reed means resonant at a selected call frequency and having a pair of reed members in tuning fork type arrangement, one of said reed members being excited by an input winding located in inductive relation therewith whenever said selected frequency is applied to said winding, and an output winding located in inductive relation to the other of said reed members and having a signal induced thereon by the sympathetic oscillation of said other reed member; means connecting said resonant reed means input winding to be energized by the receiver of said transceiver equipment; and means including amplifier means and switch means operable to regeneratively connect said output winding to said input winding so that said resonant reed means oscillates and provides an electrical output at the resonant frequency of said reeds, said means connecting said electrical output to the transmitter of said transceiver equipment to modulate said transmitter.

11. In selective calling system apparatus for use with radio transceiver equipment; band pass frequency responsive means responsive at a selected call frequency and having a pair of frequency responsive members, one of which members being excited by an input winding located in inductive relation therewith whenever said selected frequency is applied to said winding, and an output winding located in inductive relation to the other of said responsive members and having a signal induced thereon by the sympathetic oscillation of said other frequency responsive member; means connecting said band pass frequency responsive means input winding to be energized by the receiver of said transceiver equipment; and means including amplifier means and switch means operable to regeneratively connect said output winding to said input winding so that said band pass frequency responsive means oscillates and provides an electrical output at said selected call frequency, said means connecting said electrical output to the transmitter of said transceiver equipment to modulate said transmitter.

References Cited in the file of this patent

UNITED STATES PATENTS

| | | |
|---|---|---|
| 1,637,442 | Dorsey | Aug. 2, 1927 |
| 1,708,945 | Horton | Apr. 16, 1929 |
| 2,113,365 | Artzt | Apr. 5, 1938 |
| 2,141,277 | Nickel | Dec. 27, 1938 |
| 2,147,492 | Mead | Feb. 14, 1939 |

FOREIGN PATENTS

| | | |
|---|---|---|
| 759,581 | Germany | Mar. 29, 1954 |